United States Patent [19]

Yarrington

[11] 3,787,335

[45] Jan. 22, 1974

[54] PRE-REDUCTION OF AMMONIA SYNTHESIS CATALYST USING HYDROGEN

[75] Inventor: Robert Murphy Yarrington, Old Greenwich, Conn.

[73] Assignee: American Cyanamid Company, Stamford, Conn.

[22] Filed: June 2, 1971

[21] Appl. No.: 149,348

[52] U.S. Cl. ............. 252/472, 148/6.35, 75/.5 BA, 75/26, 75/34
[51] Int. Cl.... B01j 11/22, C23c 11/12, C21c 15/00
[58] Field of Search....... 252/472; 75/26, 34, .5 BA; 148/6.35

[56] References Cited
UNITED STATES PATENTS

| | | | |
|---|---|---|---|
| 2,254,748 | 9/1941 | Michael et al. | 252/472 |
| 2,707,706 | 5/1955 | Bauch | 252/472 |
| 3,644,216 | 2/1972 | Egalon | 252/472 |
| 2,900,246 | 8/1959 | Keith et al. | 75/26 |
| 3,140,940 | 7/1964 | Keith | 75/34 |
| 3,147,106 | 9/1964 | Johnson et al. | 75/.5 BA |
| 3,199,974 | 8/1965 | Johnson et al. | 75/.5 BA |
| 3,227,546 | 1/1966 | Johnson et al. | 75/34 |
| 3,549,425 | 12/1970 | Segura | 148/6.35 |
| 3,551,215 | 12/1970 | Claiborne et al. | 148/6.35 |
| 3,617,394 | 11/1971 | Mayer | 148/6.35 |

FOREIGN PATENTS OR APPLICATIONS 502,542    3/1939    Great Britain ..................... 252/472

Primary Examiner—A. B. Curtis
Assistant Examiner—Mark Bell
Attorney, Agent, or Firm—William J. Van Loo, Jr.

[57] ABSTRACT

A process for reducing an iron oxide catalyst material useful in ammonia synthesis employing a gas consisting essentially of hydrogen and substantially no gaseous component which will react under the conditions of reduction, a temperature of at least 450°C. and a pressure of at least 45 psig.

2 Claims, No Drawings

PRE-REDUCTION OF AMMONIA SYNTHESIS CATALYST USING HYDROGEN

This invention relates to a process for pre-reduction of ammonia synthesis catalyst. More particularly this invention relates to a process wherein ammonia synthesis catalyst is pre-reduced using hydrogen gas.

A basic process for the production of ammonia is by reaction of hydrogen and nitrogen in proper proportions under pressure at elevated temperatures in the presence of a suitable catalyst. The most widely used catalyst is that resulting from reduction of purified natural or synthetic magnetite, or a mixture thereof. The reaction in ammonia synthesis is given by the equation $$N_2 + 3H_2 \rightleftharpoons 2NH_3$$

The process is carried out continuously employing a mixture of hydrogen and nitrogen gases in molar proportions of 3:1, respectively, said mixture being conveniently referred to as synthesis gas. The synthesis gas is circulated through a converter which contains the catalyst. The process is carried out under high pressures at high temperatures at high space velocities. In the cyclic process, a portion of the gas emanating from the converter is bled off and additional feed is added to replace the bleed. The bleed contains product ammonia, hydrogen, nitrogen and other constituents as impurities, the proportions of all constituents depending upon the equilibrium achieved by the conditions of operation. The ammonia is separated from the bleed and the residue is generally referred to as purge gas. Most plants burn purge gas for its heat values. In other plants, the purge gas is purified to remove undesirable contaminants, is compressed to make up pressure lost in ammonia recovery, and is then admixed with synthesis gas as feed for the continuous ammonia synthesis process.

From time to time as additional converters are added for ammonia synthesis or ineffective converters are replaced, it becomes necessary to prepare fresh catalyst. Catalyst is generally prepared by electrically melting iron oxide, together with any promoter ingredients contemplated, in a protective bed of essentially the same composition as the catalytic material. The resulting oxide is cooled, crushed, and charged into a converter where the iron oxide is reduced with synthesis gas by a reaction indicated by the equation $$Fe_3O_4 + 4H_2 \rightarrow 3Fe + 4H_2O$$

The process of reduction is controlled and, ideally, a porous structure results, with any promoters present being well-distributed therein. However, in practice the nature of the catalyst varies widely depending upon conditions employed in preparation and in subsequent handling.

The freshly prepared catalyst is pyrophoric, spontaneously oxidizing when exposed to air. Accordingly, the catalyst is normally prepared in the converter in which it is to be used and it is placed into use immediately upon preparation. In those instances where a converter is taken out of service or where a catalyst preparation is to be taken from a converter for storage for future use, it is necessary that the catalyst be stabilized not only to facilitate removal but to protect its future utility. In some instances the catalyst becomes poisoned during continued use and must be replaced for efficient ammonia synthesis. In such cases removal of the poisoned catalyst will present difficulties in removal from the converter unless stabilization is effected. Stabilization is effected by cooling the catalyst in the presence of an inert atmosphere and then subjecting the cooled catalyst to an atmosphere of 0.5–1.0 mole percent oxygen and the balance nitrogen. After this mixture has been swept over the catalyst at a temperature below 100°C. for a period of time sufficient to equilibrate the amount of oxygen picked up by the catalyst, the gas mixture is replaced by air, generally at a slow rate. If the catalyst is not to be used immediately, it is generally stored in sealed containers which contain an inert atmosphere. The stabilized catalyst then is partially re-oxidized but is readily reduced when put to use in a short time by contact with the synthesis gas used in the ammonia process.

In preparing the catalyst, reduction is conventionally carried out with synthesis gas since ammonia plants have a supply thereof and the hydrogen content therein can be effectively used to carry out the reduction. However, use of synthesis gas for reduction of iron oxides to prepare the catalyst causes excessive loss of potential product and, in addition, requires careful adjustment of temperature during the reduction reaction and necessitates excessively long time periods for catalyst reduction. Accordingly, there continues to exist the need for an alternative process for reduction of iron oxide catalysts useful in ammonia synthesis, which process eliminates deficiencies associated with the conventional processes.

In accordance with the present invention, there is disclosed a process for reducing iron oxide catalyst material useful in ammonia synthesis, which process comprises contacting said catalyst material with a gas consisting essentially of hydrogen and containing substantially no gas which reacts under the reduction conditions and effecting reduction isothermally at a temperature of at least 450°C. and at a pressure of at least 45 pounds per square inch gauge.

The process of the present invention enables the reduction reaction to be carried out without use of limited heating schedules and enables complete reduction to be achieved in a time period which is significantly reduced from that required in the conventional process. It is surprising that a catalyst of high efficiency in ammonia synthesis should be obtained in such a short reduction time and in the absence of restricted heating schedule.

The process of the present invention is particularly useful where an inexpensive source of hydrogen gas is available. An important source of hydrogen gas in the United States is thermal reforming of natural gas with steam. Additional sources in other parts of the world, and to some extent in the United States, are the following: (1) decomposition of steam over hot lignite or coke to make water gas; (2) partial oxidation of hydrocarbons; (3) by-product hydrogen from catalytic reforming of petroleum naphtha in production of gasoline; and (4) electrolysis of water. Hydrogen may also be produced by the steam iron process or the partial oxidation of wood.

Among the various catalysts employed in carrying out the ammonia synthesis process promoted iron catalysts are outstanding in activity and stability under operating conditions. Double promotion, that is, the addition to the iron oxide of both an acidic or amphoteric oxide, such as aluminum oxide, and an alkaline oxide, such as potassium oxide, increases the activity much more than the addition of the acidic oxides alone.

In carrying out the process of the present invention, a suitable iron oxide material and any promoter ingredients are placed in a suitable reactor, which conveniently can be a converter used in ammonia synthesis. After the reactor is charged with catalyst material, it is purged with nitrogen until all oxygen is removed. The reactor is next pressurized with hydrogen gas flowing and is heated rapidly to the desired reaction temperature. The reaction is then carried out isothermally until reduction is complete.

The catalyst material to be reduced generally has a composition of about 95% $Fe_3O_4$ and about 5% of promoter ingredients. Typically, the composition to be reduced will range as follows:

| Component | % by weight |
|---|---|
| $Fe_2O_3$ | 64–66 |
| Fe O | 29–31 |
| $Al_2O_3$ | 2–3 |
| Ca O | 1–3 |
| Si $O_2$ | 0.8 |
| $K_2O$ | 0–2 |

The hydrogen gas used in carrying out the reduction according to the present process may be obtainable from any source but must contain substantially no gaseous component which will react under the conditions of reduction. The amount of a reactive gaseous component that can be tolerated is about 0.5% by weight based on the total weight of the gas composition and it is with this significance that the term "substantially" is employed. The amount of inert gas that can be present may be as high as about 30% by weight based on the total weight of the gas composition. It is to be noted that gases which may be considered inert for some purposes are not necessarily inert in the present process. Gases considered inert for the present purposes include argon, helium, methane, and the like. Gases which are reactive under the reduction conditions of the present process include nitrogen, carbon monoxide, carbon dioxide, and the like. It is the latter gases which individually must be present at 0.5% or less by weight based on the weight of the gas composition.

The temperature at which the reduction may be carried out efficiently according to the present invention is at least 450°C., and the upper value is only limited by practical considerations, such as the nature of the equipment employed, the available source of heat, economics of the process, safety hazards, etc. Preferably, the reduction is carried out at a temperature of 500°C. or higher. Once the reduction temperature is selected, it is merely necessary to heat the catalyst material rapidly to the preselected temperature and carry out reduction isothermally at the temperature selected. It should be noted that the reaction is endothermic in nature and, accordingly, continued heating will be required to maintain the reaction under isothermal conditions.

The pressure at which the reduction is carried out should be at least 45 p.s.i.g. If the pressure is below this value, the reaction will be inefficient and the decreased reduction times will not be realized. The upper value of pressure will also be determined by practical considerations, such as economics of the process, equipment employed, safety hazards, etc. Since, however, the reduction process can be efficiently run at pressures in the range of 45–100 p.s.i.g., the use of higher pressures does not appear to offer any advantage.

In carrying out the reduction reaction, the rate at which the reaction reaches completion is determined to some extent by the space velocity of the reducing gas employed. Space velocity is usually defined as the number of liters of gas (as measured at standard temperature and pressure) passing over a liter of catalyst space in an hour. In the present process, the velocity of hydrogen gas may vary widely, and the reaction efficiency is more dependent upon the particular pressure and temperature selected for isothermal reduction than on any specific space velocity. Accordingly, the operable space velocity may vary from about 500 to 40,000 or more per hour, while preferably a value of from about 1,000 to 10,000 per hour is suitable.

Completion of the reduction reaction may be determined from measurement of water produced. When water can no longer be detected in the stream of gas emanating from the reactor, reduction is complete. The water can be trapped and weighed in a molecular sieve drying tower to confirm that the theoretical amount of water has been substantially achieved.

Once the reduction reaction is complete, the catalyst may be used immediately in ammonia synthesis by replacing the hydrogen stream by a synthesis gas stream and effecting changes in pressure, temperature, and space velocity, as desired. If, however, it is desired to defer use of the reduced catalyst or to move the reduced catalyst from the reactor for storage elsewhere, it is necessary to stabilize the reduced catalyst as previously discussed.

The invention is further illustrated by the examples which follow, in which the parts and percentages are by weight unless otherwise specifically designated.

EXAMPLE 1

A reactor having a 6.27 centimeter inner diameter and 29.63 square centimeters annular area was employed. Into this reactor were charged 120 cubic centimeters corresponding to 300 grams of a catalyst material of particle size ranging from 8–12 millimeters and a composition as follows:

| | |
|---|---|
| $Fe_2O_3$ | 62.1 |
| Fe O | 31.4 |
| $Al_2O_3$ | 1.67 |
| Si $O_2$ | 0.03 |
| P | 0.006 |
| $K_2O$ | 1.1 |

The reactor was purged with nitrogen gas to remove all oxygen gas. The reduction was then carried out using hydrogen gas under the the following conditions:

| | |
|---|---|
| Pressure psig | 45 |
| Flow Rate, SLPM | 4 |
| Temp., °C. | 500 |
| Linear Velocity cm/sec. | 1.69 |
| Space Velocity, $hr^{-1}$ | 2000 |
| Gas Density, gr/cc | $1.26 \times 10^{-4}$ |
| Viscosity, gr/cm-sec. | $1.7 \times 10^{-4}$ |
| Reynolds Number | 1.0 |
| $j_D$ (mass transfer factor) | 1.82 |
| Mass Flux, gm moles/sec-$cm^2$ | $1.06 \times 10^{-4}$ |
| Average Molecular Weight | 2 |
| Diffusivity of Water thru Gas, $cm^2$/sec. | 1.02 |
| Schmidt Number $\mu/P\, D_{1M}$ | 1.32 |
| Mass Transfer Coefficient, $K_g$ (gm moles/sec-$cm^2$ atm.) | $3.96 \times 10^{-5}$ |

After a total of 48 hours reduction was complete.

The reduced catalyst was then cooled to 54.5°C. under a nitrogen gas flow. The gas content was then changed so as to contain 1 mole % oxygen and 99 mole % nitrogen. This gas was passed over the catalyst for a total of 8 2/3 hours, at which time the inlet and outlet concentrations of oxygen were identical. During this time, the temperature of the catalyst was maintained in the range of 52°–57°C.

The catalyst obtained weighed 238 grams, had an iron content of 86.3%, corresponding to a reduction of 78% based on the original content of 95% $Fe_3O_4$ of the unreduced catalyst material. The catalyst had the following properties:

| | |
|---|---|
| Surfact Area (square meters per gram) | 15.1 |
| Pore Volume ($N_2$) (cubic centimeters per gram) | 0.040 |
| Average Pore Diameter A° | 105 |
| % of Area in Pores 120A° | 90 |
| % of Area in Pores 60A° | 83 |
| % of Area in Pores 19A° | 64 |

Performance of the reduced catalyst was determined by substituting synthesis gas for hydrogen gas just prior to cooling the reduced catalyst with nitrogen gas in the stabilization procedure described above. The pressure was 100 p.s.i.g., the temperature 500°C., and the space velocity 3,000/hour. An efficiency of 80% was obtained.

EXAMPLE 2 (COMPARATIVE)

The procedure of Example 1 was followed in every material detail except that synthesis gas was employed in place of hydrogen gas, the operating pressure was 75 p.s.i.g., and the time of reduction was 50 hours. Although the catalyst obtained corresponded to a reduction of 80%, the total surface area was only 9.3 square meters per gram and efficiency in ammonia synthesis was only 32%.

This example illustrates the poor results obtained when reduction is carried out isothermally with synthesis gas.

EXAMPLE 3 (COMPARATIVE)

Catalyst material and equipment employed was as in Example 1. Synthesis gas was employed as the reducing gas. Operating pressure was 100 p.s.i.g. and space velocity was 3,000 per hour. The heating schedule employed was as follows:
1. Heat to 330°C. as fast as possible.
2. Heat to 400°C. at 3.5°C. per hour.
3. Heat to 475°C. at 2.0°C. per hour.
4. Heat to 500°C. at 1.0°C. per hour.
5. Hold at 500°C. for 20 hours.

A total heating time of 107 hours was required.

Stabilization was as in Example 1. The catalyst obtained had a total surface area of 14.6 square centimeters per gram and exhibited an efficiency in ammonia synthesis of 80%.

This example illustrates the long reduction times required to produce a satisfactory catalyst with synthesis gas.

EXAMPLE 4

The procedure of Example 1 was followed in every material detail except that the gas employed had a content as follows:

| Component | % by weight |
|---|---|
| hydrogen | 93.3 |
| methane | 6.5 |
| nitrogen | 0.1 |
| carbon monoxide | 0.1 |

This gas composition was obtained by the process described in U.S. Pat. No. 3,129,060, Apr. 14, 1964, J. B. Pohlenz.

A catalyst of essentially the same properties as that of Example 1 was obtained.

I claim:
1. A process solely for pre-reduction of ammonia synthesis catalyst, said catalyst having a composition of from about 64–66 weight percent $Fe_2O_3$, 29–31 weight percent FeO and the balance promoter ingredients, which process consists essentially of contacting said catalyst with a gas consisting essentially of hydrogen and less than about 0.5 weight percent of gaseous components which will react under the reduction conditions and effecting reduction isothermally at a temperature of at least 450°c. and at a pressure in the range of 45–100 pounds per square inch gauge, said contacting being carried out at a space velocity of from about 500 to 40,000 per hour and wherein the catalyst material is stabilized after reduction by cooling in the presence of an inert atmosphere and then subjecting the catalyst to an atmosphere of 0.5–1.0 mole percent oxygen and the balance nitrogen at a temperature below 100°C. for a period of time sufficient to equilibrate the amount of oxygen picked up by the catalyst and replacing the gas mixture by air.

2. The process of claim 1 wherein said stabilization is effected by use of a gas mixture containing 1 mole percent oxygen and 99 mole percent nitrogen at a temperature below 100°C.

* * * * *